United States Patent
Alves et al.

(10) Patent No.: US 7,526,489 B2
(45) Date of Patent: Apr. 28, 2009

(54) METHODS TO INTEGRATE USER-DEFINED OPERATIONS INTO A DATABASE

(75) Inventors: Vander R. Alves, Recife (BR); Curt L. Cotner, Gilroy, CA (US); Mary A. Roth, San Jose, CA (US); Morgan Y. Tong, Austin, TX (US); Charles Daniel Wolfson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 482 days.

(21) Appl. No.: 10/717,407

(22) Filed: Nov. 18, 2003

(65) Prior Publication Data
US 2005/0108255 A1    May 19, 2005

(51) Int. Cl.
    G06F 7/00    (2006.01)
    G06F 17/00   (2006.01)
(52) U.S. Cl. .............................. 707/100; 707/3; 707/10; 707/201; 707/202
(58) Field of Classification Search .................. 707/100
     See application file for complete search history.

(56) References Cited

U.S. PATENT DOCUMENTS

| | | |
|---|---|---|
| 4,714,995 A | 12/1987 | Materna et al. |
| 5,140,689 A | 8/1992 | Kobayashi |
| 5,165,031 A | 11/1992 | Pruul et al. |
| 5,212,788 A | 5/1993 | Lomet et al. |
| 5,241,675 A | 8/1993 | Sheth et al. |
| 5,276,876 A | 1/1994 | Coleman et al. |
| 5,428,771 A | 6/1995 | Daniels et al. |
| 5,428,782 A | 6/1995 | White |
| 5,452,445 A | 9/1995 | Hallmark et al. |
| 5,546,582 A | 8/1996 | Brockmeyer et al. |
| 5,550,982 A | 8/1996 | Long et al. |
| 5,553,234 A * | 9/1996 | Cotner et al. ................ 714/16 |
| 5,561,797 A | 10/1996 | Gilles et al. |

(Continued)

OTHER PUBLICATIONS

"A Design and Implementation of Savepoints and Partial Rollbacks Considering Transaction Isolation Levels of SQL2", by Sun Hwan Kim et al., Proceedings of the Sixth International Conference on Database Systems for Advanced Applications, Hsinchu, Taiwan, Apr. 19-22, 1999.*

(Continued)

*Primary Examiner*—Tim T. Vo
*Assistant Examiner*—Jay A Morrison
(74) *Attorney, Agent, or Firm*—Janaki K. Davda; Konrad Raynes & Victor LLP

(57) ABSTRACT

Systems, methods, and computer products that support techniques associated with highly reliable transaction protocol semantics in databases. Such techniques extend database transaction semantics that support a single-phase or a two-phase commit protocol to include user-defined operations while supporting the XA X/Open® Distributed Transaction Processing Protocol ("XA Transaction Protocol"). The preferred embodiment of the present invention novelly enables user-defined operations that access external resources by means of the XA Transaction Protocol to be included in database transaction processing features. Thereby user-level access to well-defined APIs is provided. Further, the preferred embodiment of the present invention novelly ensures atomicity for the results of the database transaction that includes both the user-defined operations and database operations. According to the preferred embodiment of the present invention the database acts, in part, as an XA transaction manager.

9 Claims, 4 Drawing Sheets

U.S. PATENT DOCUMENTS

| | | | |
|---|---|---|---|
| 5,689,633 A * | 11/1997 | Cotner et al. | 714/16 |
| 5,696,961 A | 12/1997 | Briscoe et al. | |
| 5,822,780 A | 10/1998 | Schutzman | |
| 5,835,770 A | 11/1998 | Shum et al. | |
| 5,953,719 A | 9/1999 | Kleewein et al. | 707/8 |
| 6,058,393 A * | 5/2000 | Meier et al. | 707/10 |
| 6,101,527 A * | 8/2000 | Lejeune et al. | 709/201 |
| 6,138,169 A | 10/2000 | Freund et al. | 709/313 |
| 6,226,649 B1 * | 5/2001 | Bodamer et al. | 707/104.1 |
| 6,233,587 B1 * | 5/2001 | Tandon | 707/103 R |
| 6,360,228 B1 | 3/2002 | Sundara et al. | 707/102 |
| 6,832,238 B1 * | 12/2004 | Sharma et al. | 709/201 |
| 2002/0194244 A1 * | 12/2002 | Raventos | 709/101 |
| 2003/0163479 A1 * | 8/2003 | Mathews et al. | 707/102 |
| 2004/0133591 A1 * | 7/2004 | Holenstein et al. | 707/102 |

OTHER PUBLICATIONS

Technical Standard, X/Open CAE Specification, *Distributed Transaction Processing: The XA Specification,* X/Open Company Limited, X/Open Document No. XO/CAE/91/300, Dec. 1991.

Technical Standard, X/Open CAE Specification, *Distributed Transaction Processing: The TX (Transaction Demarcation) Specification,* X/Open Company Limited, X/Open Document No. C504, Apr. 1995.

Guide, X/Open Guide, *Distributed Transaction Processing: Reference Model, Version 3,* X/Open Company Limited, X/Open Document No. G504, Feb. 1996.

IBM Technical Disclosure Bulletin, vol. 31, No. 5, Oct. 1988, pp. 1-2, "Interpretive Database Merge Join Operation".

IBM Technical Disclosure Bulletin, vol. 24, No. 2, Jul. 1981, pp. 1025-1026, J.W. Mehl, "Two-Phase Commit Protocol for Distributed Communication Systems".

IBM Technical Disclosure Bulletin, vol. 35, No. 2, Jul. 1992, pp. 233-239, "Architecture for High Performance Transparent Bridges".

IBM Technical Disclosure Bulletin, vol. 39, No. 2, Feb. 1996, pp. 235-236, "Use of Structured Query Language Packages for Supporting Extended Dynamic Structured Query Language".

IBM Technical Disclosure Bulletin, vol. 40, No. 2, Feb. 1997, pp. 199-204, "Optimizing Use of Local Coordinators in Distributed Applications".

Sigmod Record, vol. 23, No. 2, Jun. 1994, p. 468, D. Dietterich, "DEC Data Distributer: for Data Replication and Data Warehousing".

\* cited by examiner

FIG. 4

US 7,526,489 B2

METHODS TO INTEGRATE USER-DEFINED OPERATIONS INTO A DATABASE

CROSS-REFERENCE TO RELATED PATENT

In U.S. Pat. No. 5,953,719, entitled "Heterogeneous Database System with Dynamic Commit Procedure Control," assigned to the assignee of the present invention, and incorporated herein in its entirety by this reference, there is described a heterogeneous database system employing a dynamic commit procedure control. Although not limited thereto, the present invention employs such a method in one of its preferred embodiments.

BACKGROUND OF THE INVENTION

1. Field of the Invention

The present invention is directed to the field of computer-implemented database transaction management. It is more particularly directed to efficiently extending database transaction semantics to include user-defined operations.

2. Description of the Background Art

A computer-implemented database is a collection of data, organized in the form of tables. A table typically consists of columns that represent data of the same nature, and records that represent specific instances of data associated with the table. A relational database is a database that may be a set of tables containing information that is manipulated in accordance with the relational model associated with the data. For example, the product marketed under the trademarks IBM DB2 stores the data associated with the database in tables, and each table has a name. It will be appreciated that other vendors also provide databases, including relational databases.

Many databases enable users to extend database operations with user-customizable features. Examples of such extensibility mechanisms include user-defined functions and operations, stored procedures, extenders, blades, wrappers, and connectors. Such extensibility mechanisms will be referred to herein as user-defined operations. Such user-defined operations may be implemented by program code used to perform tasks that are specific to applications that operate in conjunction with databases such as data computations and transformations, and to retrieve data from external sources. The user-defined operations are often tightly coupled with the database, and typically may be executed as part of normal database operations such as queries and updates, and performed on data managed by the database before it is returned to the application. This tightly coupled execution model is crucial to ensuring high performance execution of data-intensive database applications.

A transaction is a unit of work that often changes data and that is typically created by operations associated with a database application program. A transaction typically includes execution of an application program specified sequence of operations that are initiated with a begin transaction operation, that include one or more update or read access operations, and that end with either a commit or a rollback operation. Database transactions associated with highly critical database applications operate reliably by ensuring that transactions are completely performed when committed or fully rolled back if an error occurs during the operation of the transaction. User-defined operations may perform updates, so it is desirable to be able to extend the operation of database transactions to include the user-defined operations.

A highly reliable transaction typically includes the following features that ensure reliable updates of the associated data: atomicity, consistency, isolation, and durability (ACID). Atomicity ensures that the results of a transaction are treated as a unit and either completed or backed out as a unit, either by a data commit or roll back operation. Those skilled in the art will appreciate the data commit operation and the data roll back operation. Atomicity is typically implemented by a single-phase commit protocol in a non-distributed database environment and by a two-phase commit protocol in a distributed database environment. The two-phase commit protocol typically probes the computer-related resources associated with the transaction to ensure they are ready to commit and only commits the transaction if all resources are ready to commit. Consistency ensures that the transaction changes data from one valid state to another valid state. Isolation ensures that intermediate changes to the data that occur during the transaction operation are not accessible until the transaction has completed a data commit operation. Durability ensures that intermediate changes to the data that occur during the transaction survive subsequent computer-system failures.

While most database products do not extend transaction semantics to user-defined operations, the IBM DB2 product does enable such extended transaction semantics through integration with the Resource Recovery Services Transaction Control Facility embedded in the operating system marketed under the trademark Z/OS®. This integration enables user-defined operations to commit and rollback through the database, but not as part of the database transaction, and relies on a proprietary solution.

It would be useful for database products to extend non-proprietary highly reliable database transaction semantics, such as computer transaction protocols, to include user-defined operations that access resources external to the database ("external resources"). More particularly it would be useful if user-defined operations operated in existing, well-defined, highly reliable, industry standard database transaction protocol semantics that support atomicity. From the foregoing it will be apparent that there is still a need to improve the techniques associated with highly reliable transaction protocol semantics that support user-defined operations and that are in databases.

SUMMARY OF THE INVENTION

An embodiment of the present invention relates to systems, methods, and computer products that efficiently support techniques associated with highly reliable transaction protocol semantics in databases. More particularly, the preferred embodiment of the present invention extends database transaction semantics that support a single-phase or a two-phase commit protocol to include user-defined operations that access external resources by means of a novel use of the XA X/Open® Distributed Transaction Processing Protocol ("XA Transaction Protocol"). It will be appreciated by those skilled in the art that XA is an industry standard two-phase commit application programming interface (API) that operates between a transaction manager, such as an XA transaction manager and a resource manager. The phrase, "distributed transaction processing" herein refers to transaction processing distributed over computer operating systems, such as the product marketed under the trademark UNIX and the IBM OS/390®. Those skilled in the art will appreciate that an XA transaction manager manages distributed transactions by means such as, coordinating decisions about commit or rollback of pending transactions, and coordinating failure recovery. It has been difficult in the past for database products to extend highly reliable database transaction semantics to user-defined operations that support industry-standards and atomicity.

The preferred embodiment of the present invention novelly enables user-defined operations that access external resources that support the XA Transaction Protocol to be included in database transactions by enabling the database to act as an XA Transaction Manager. More particularly and in the preferred embodiment of the present invention, user-defined operations are novelly included in a data access module (DAM) as described in U.S. Pat. No. 5,953,719. A DAM is a program which specifies procedures and provides necessary data to enable data transactions to be carried out with a respective database type. An entry in a DAM may comprise a default commit protocol that is either single phase or two phase, and the commit protocol may be used with a respective database type. While the preferred embodiment of the present invention uses DAM technology to register the XA Transaction Protocol Interface, it will be appreciated that other embodiments within the spirit of the invention may be implemented without such a DAM.

Further, the preferred embodiment of the present invention novelly ensures atomicity for the results of the database transaction that includes both the user-defined operations and database operations. Such operations may access external resources managed by distributed transaction processing resource managers or by local database managers. It will be appreciated by those skilled in the art that resource managers typically access computer system resources, such as databases and message systems.

The preferred embodiment of the present invention also supports an industry-standard management of database transactions, the XA Transaction Protocol. It will be appreciated that many applications and products are XA-compliant implementations, such as message systems and application services. Therefore, since the preferred embodiment of the present invention supports the XA Transaction Protocol, such XA-compliant implementations may be easily integrated to take advantage of the user-defined operations.

According to the preferred embodiment of the present invention, the database acts in part as an XA transaction manager, and novelly translates and executes distributed transactions that include database operations and user-defined operations that access resources that adhere to the XA Transaction Protocol. Further, the user-defined operations enable user access to a variety of XA resources, such as a message system, by the XA Resource Manager. More particularly, the preferred embodiment of the present invention enables the user to invoke, via the user-defined operations, software code in the resource manager that may, in combination with the DAM, novelly support the XA Transaction Protocol. Such user-defined operations software code is directed to a computer resource, such as a message system. Therefore, the preferred embodiment of the present invention novelly enables user-defined operations to access critical computer resources that are integrated with database resources while ensuring data recoverability via atomicity in database transactions.

An embodiment of the present invention is achieved by systems, methods, and computer products that extend highly reliable database transaction semantics, by including user-defined operations in the database transaction. An embodiment of the method comprises two phases, a Registration Phase and a Runtime Phase. During the Registration Phase, the user enables access to the user-defined operation in the application program code and registers it with the database that acts as an XA transaction manager. Further, the user registers, with the database, the XA Transaction Protocol Interfaces that are used by the user-defined operation code.

During the Runtime Phase, the user initiates a database transaction and invokes the user-defined operation. The application program or an external transaction manager may initiate the database transaction. The invocation of the user-defined operation is recorded with the database thereby triggering, as part of the normal transaction processing during commit or rollback, the database to invoke the registered interfaces to the XA Transaction Protocol that are, in the preferred embodiment of the present invention, implemented in the DAM. Further, and by communication between the XA Resource Manager and the DAM that is described in U.S. Pat. No. 5,953,719, the database acts as an XA transaction manager to coordinate two phase commit with the database and the external resources accessed by the user-defined operation.

An embodiment of the present invention novelly improves highly reliable database transactions by extending database transaction semantics to user-defined operations using the non-proprietary XA Transaction Protocol. Other aspects and advantages of the present invention will become apparent from the following detailed description, taken in conjunction with the accompanying drawings, illustrating by way of example the principles of the invention.

BRIEF DESCRIPTION OF THE DRAWINGS

In the following detailed description and in the several figures of the drawings, like elements are identified with like reference numerals.

DETAILED DESCRIPTION OF THE INVENTION

As shown in the drawings and for purposes of illustration, an embodiment of the invention relates to systems, methods, and computer products that efficiently support techniques associated with highly reliable transaction protocol semantics in databases. More particularly, the preferred embodiment of the present invention extends database transaction semantics that support a single-phase or a two-phase commit protocol to include user-defined operations that access external resources by means of a novel use of the XA X/Open® Distributed Transaction Processing Protocol ("XA Transaction Protocol").

Figure 1:
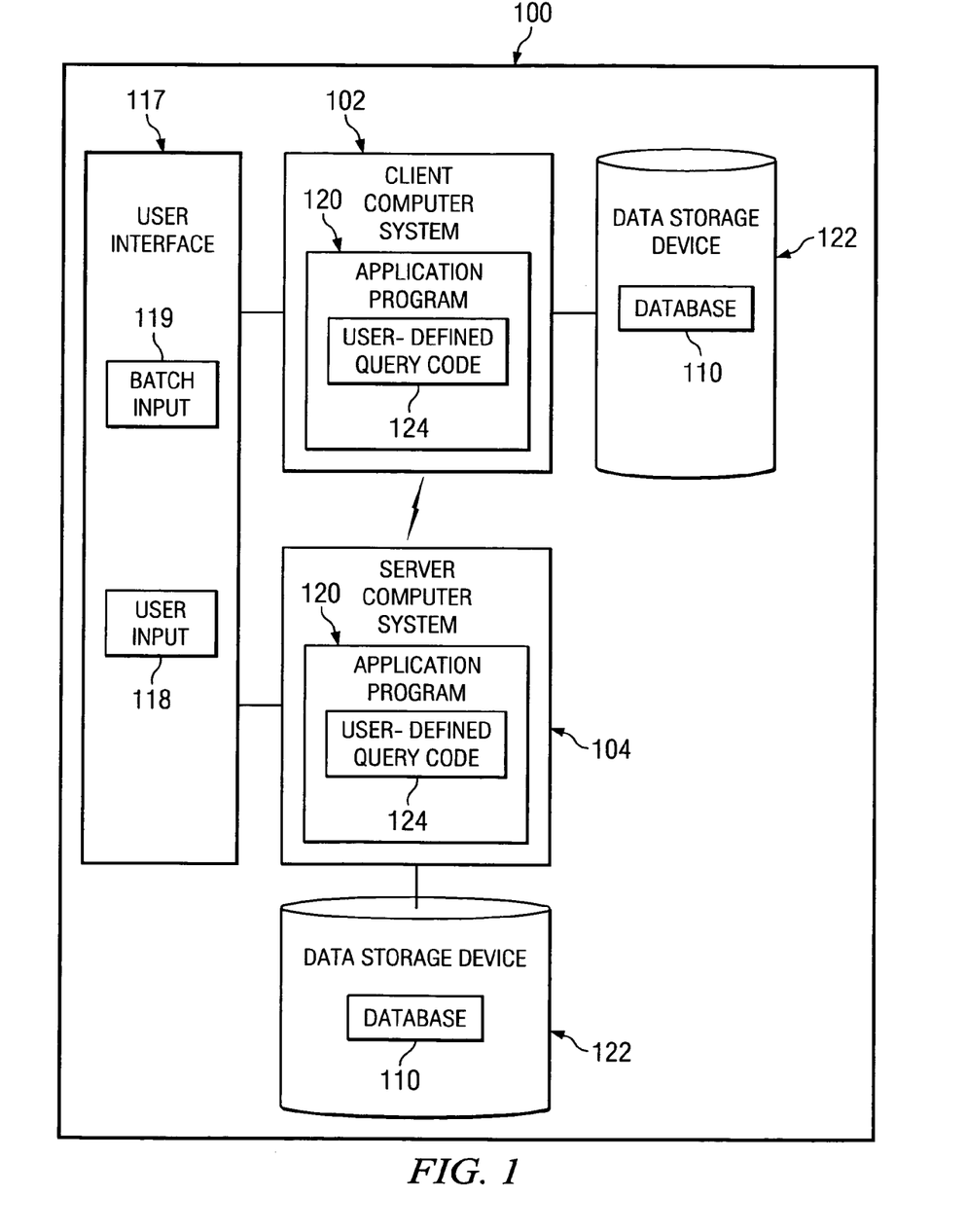
FIG. 1 is a block diagram that illustrates the computer systems that may implement the present invention.

FIG. 1 is a block diagram that illustrates the computer systems that may operate with the present invention. As shown in FIG. 1 and in element 100, the preferred embodiment of the present invention may operate in a networked computer system configuration. Therefore, a client computer system 102 may communicate with a server computer system 104 during the operation of the present invention. The preferred embodiment of the present invention operates in the server computer system 104.

The application program 120 operates in the client computer system 102 or the server computer system 104 to perform the present invention. For example, information may be communicated to either the server 104 or the client 102 via the user interface 117, such as an invocation to execute the application program 120. The user may include user-defined query code 124 in the application program 120 that is subsequently used to invoke user-defined operations software code 210. Such code supports the XA Transaction Protocol 214 and is directed to a computer system resource 226, such as a database 110. By supporting the XA Transaction Protocol 214, a user-defined operation 210 that accesses the computer system resource 226 that adheres to the XA Transaction protocol 214 may be novelly included in a database transaction 228. Elements 210, 214, 226 and 228 are described in detail with reference to FIG. 2.

The user interface 117 may communicate with the preferred embodiment of the present invention, either via batch input 119 or user input 118. Further, the database 110 may be configured in the memory 558 of the client 102 or the server 104. Alternatively the database 110 may be configured in computer storage such as that of a disk 122. Element 558 is described with reference to FIG. 5.

Figure 2:
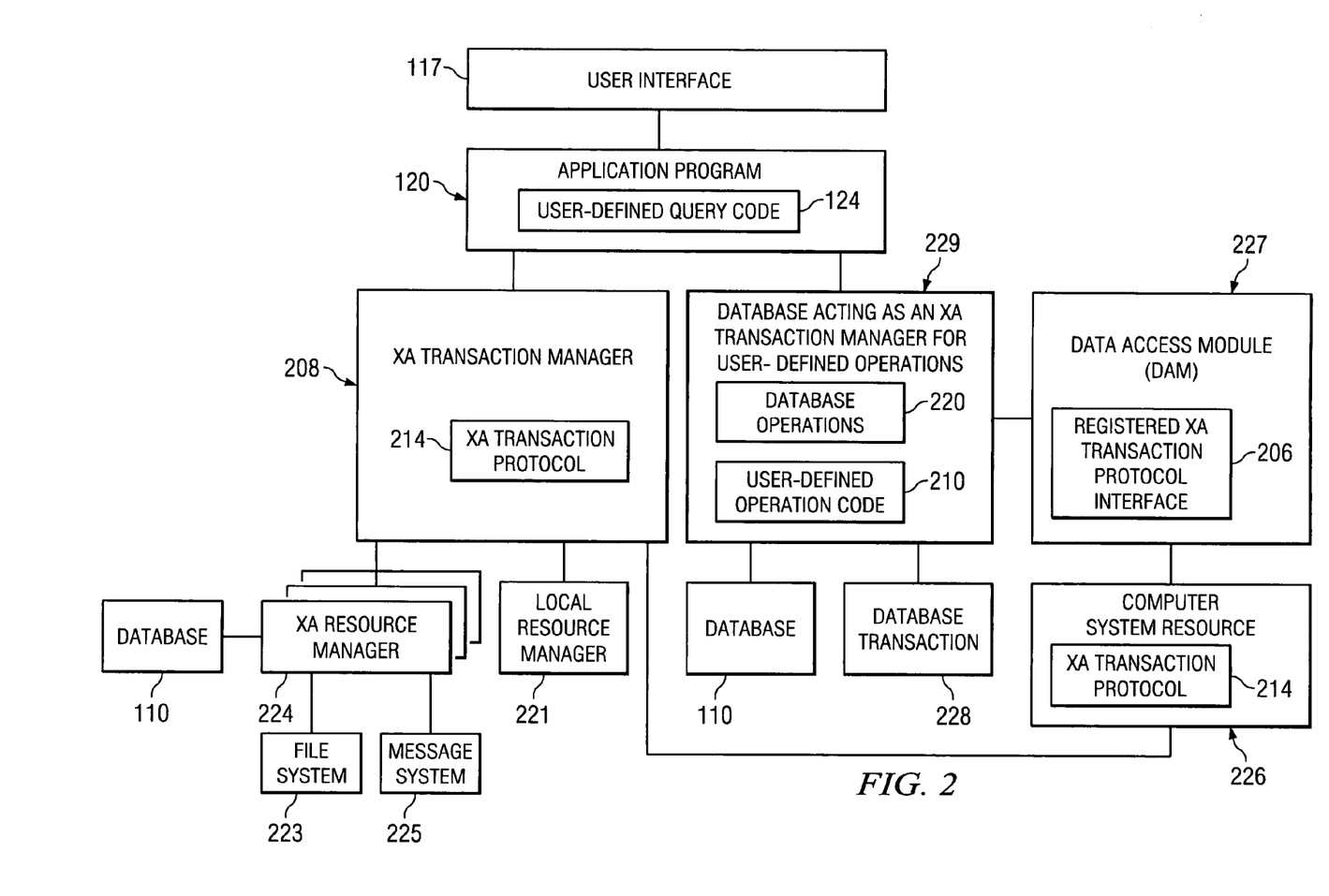
FIG. 2 is a block diagram that illustrates the preferred embodiment of the present invention.

FIG. 2 is a block diagram that illustrates the preferred embodiment of the present invention. Therefore the user interface 117 enables a user to access an application program 120 that in turn either begins a database transaction 228 with the database 110 or accesses the XA transaction manager 208 to do so. The database acting as an XA transaction manager 229 typically includes an XA Transaction Protocol 214 that is novelly used in the preferred embodiment of the present invention to enable user-defined operations 210 to be included in database transactions 228. Therefore, the user-defined query code 124 invokes user-defined operation code 210 that is included with other transaction-related code, such as database operations 220, to generate commands used in the database transaction 228. Those skilled in the art will appreciate that invoking user-defined operation code 210 may be implemented by a variety of techniques, such as providing a pointer or procedural call to a software library that contains the actual user-defined operation code 210.

Further, the preferred embodiment of the present invention novelly registers user-defined operations code 210 with the database 110 that communicates with an XA Resource Manager 224 or a local resource manager 221, so that the user-defined operations 210 may be invoked by the user-defined query code 124. In the preferred embodiment of the present invention, such communications are facilitated by including a Registered XA Transaction Protocol Interface 206 in the DAM 227.

By including the user-defined operation code 210 along with computer system software operations, such as database operations 220, during rollback or commit of the database transaction 228 the preferred embodiment of the present invention novelly ensures atomicity. Such operations may access distributed transaction processing resource managers, such as XA resource managers 224, in addition to local resource managers 221. Such resource managers typically access computer system resources 226, such as databases 110, message systems 225, and file systems 223. Any such computer system resources 226 may be accessed by the user-defined operations 210, and may be located on a local computer resource 100 or a distributed computer resource 100. Element 100 is described with reference to FIG. 1.

The preferred embodiment of the present invention novelly operates with the DAM 227 to enable the database transaction 228 to operate with both database operations 220 and user-defined operations 210. More particularly and in the present example, the database acting as an XA Transaction Manager for user defined operations 229 translates and executes distributed database transactions 228 that include database operations 220 and user-defined operations 210 that may access distributed computer system resources 226 or local computer system resources 226. Therefore, the preferred embodiment of the present invention enables the database 110 to operate as an XA transaction manager 229 when managing user-defined operations 210. More particularly, the database acting as an XA Transaction Manager 229 invokes the XA Transaction Protocol 214 to operate with the XA Resource Manager 224 that manages the computer system resources 226 accessed by user-defined operations 210. Therefore, user-defined operation code 210 and database operations code 220 may be included in a database transaction 228 that ensures atomicity.

Those skilled in the art will appreciate that structured query language (SQL) is a standardized language for defining and manipulating data in a relational database 110. While SQL command lines are used herein by means of example it should not be viewed as limiting. Many other computer-accessible forms of program code may be used to implement embodiments of the present invention.

Figure 3:
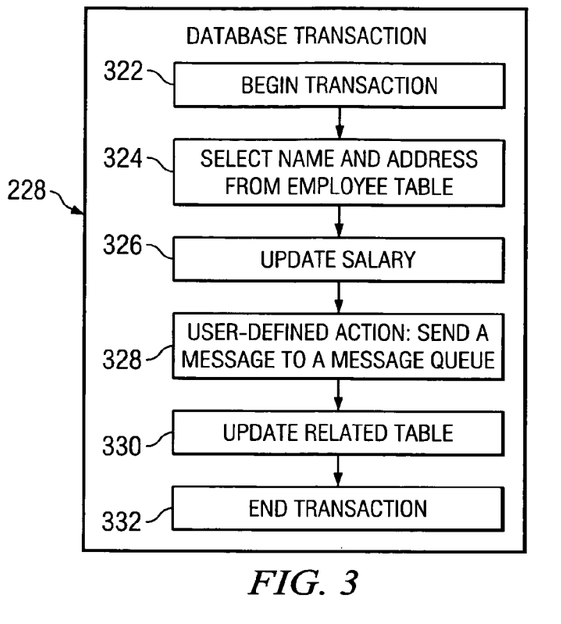
FIG. 3 is a block diagram that illustrates a database transaction.

Refer now to FIG. 3 that illustrates a database transaction 228 according to the preferred embodiment of the present invention. A begin transaction 322 initiates the database transaction 228. The application program 120 or the transaction manager 208 that is external to the database 110 may initiate the database transaction 228. In the present example an SQL SELECT command locates name and address information from an employee table 324. Then an SQL UPDATE command updates the employee salary information 326. Now, a user defined operation 210 in the present example initiates a command to send a message to a message queue 328. Then the related table is updated via an SQL UPDATE command 330. Finally the transaction is ended 332. Elements 110 and 120 are described with reference to FIG. 1, and elements 208, 210, and 228 are described with reference to FIG. 2.

Figure 4:
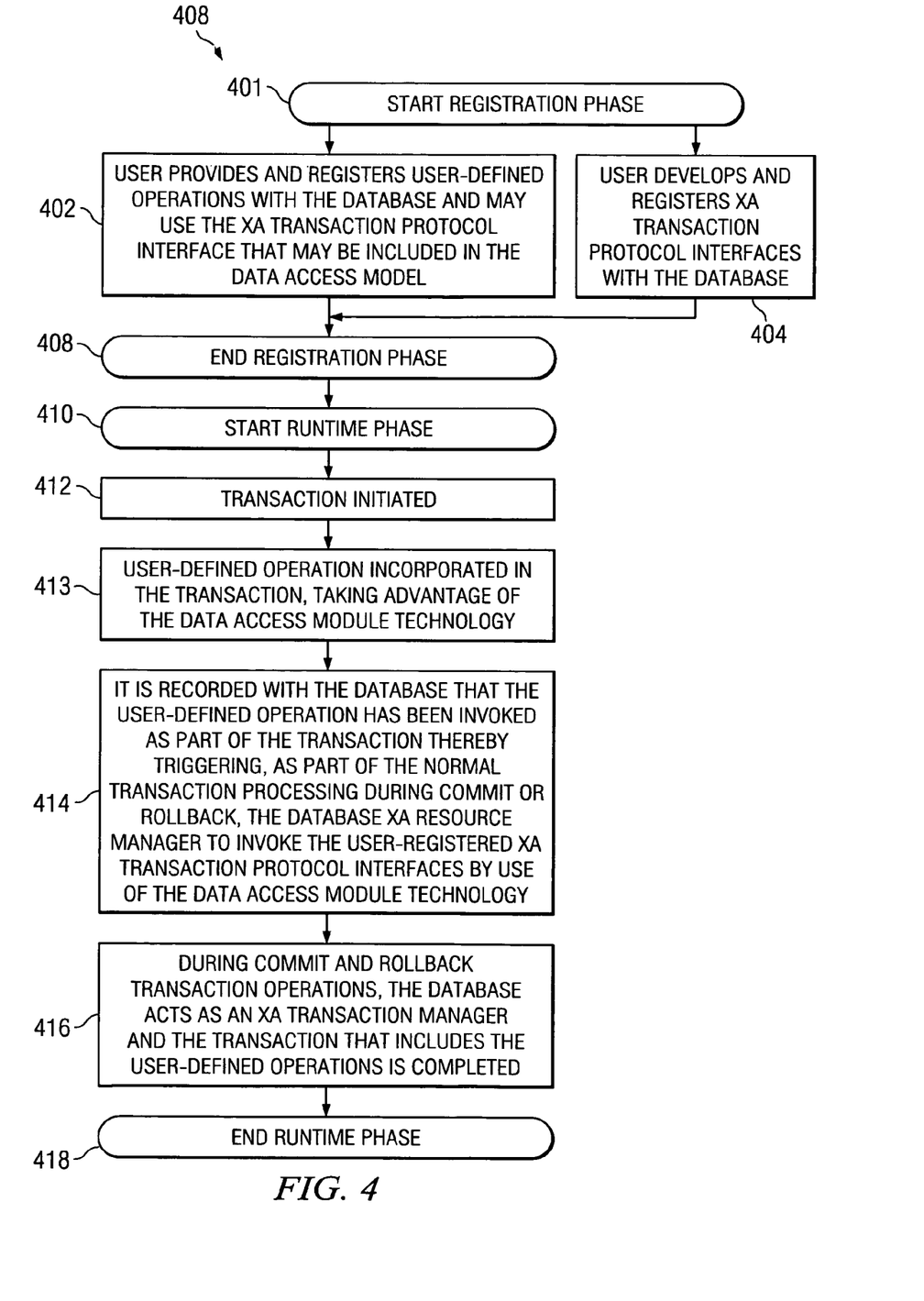
FIG. 4 is a flow diagram that illustrates the method of the preferred embodiment of the present invention.

FIG. 4 is a flow diagram that illustrates an embodiment of the present invention that includes two phases, a registration phase and a runtime phase. Therefore, as shown in element 401, the registration phase is started. As shown in element 402, the user provides the user-defined operation code 210 by the application program code 120 and registers it with the database that acts as an XA Transaction Manager 229. The user-defined operations 210 may use the XA Transaction Protocol Interface 206, which is included in the DAM 227. Further as shown in element 404, the user registers, with the database 110, the XA Transaction Protocol Interfaces 206, which are used by the user-defined operations 210. Then the registration phase is ended 408. Elements 110 and 120 are described with reference to FIG. 1, and elements 206, 210, 227, and 229 are described with reference to FIG. 2.

The runtime phase is initiated, as shown in element 410. During the Runtime Phase, and as shown in element 412, a database transaction 228 is initiated. In the preferred embodiment of the present invention and as shown in element 413, the user-defined operation 210 is incorporated in the database transaction 228 by support from the DAM 227. As shown in element 414, the invocation of the user-defined operation 210, via the user-defined query code 124, is recorded with the database 110 thereby triggering, as part of the normal transaction processing during commit or rollback, the database XA Resource Manager 224 to invoke the user registered XA Transaction Protocol Interfaces 206 by use of the DAM 227. Using the registered interfaces to the XA Transaction Protocol 214, the database supports inclusion and coordination of the user-defined operations 210 in the database transaction 228. Further, and by communication between the database 229 and the DAM 227, the database acts as an XA transaction manager 229 to coordinate two phase commit of the computer system resources 226 accessed by the user-defined operations 210. The database transaction 228 that includes the user-defined operations 210 is completed, as shown in element 416. The runtime phase is then ended, as shown in element 418. Element 124 is described with reference to FIG. 1, and elements 214, 226 and 228 are described with reference to FIG. 2.

Figure 5:
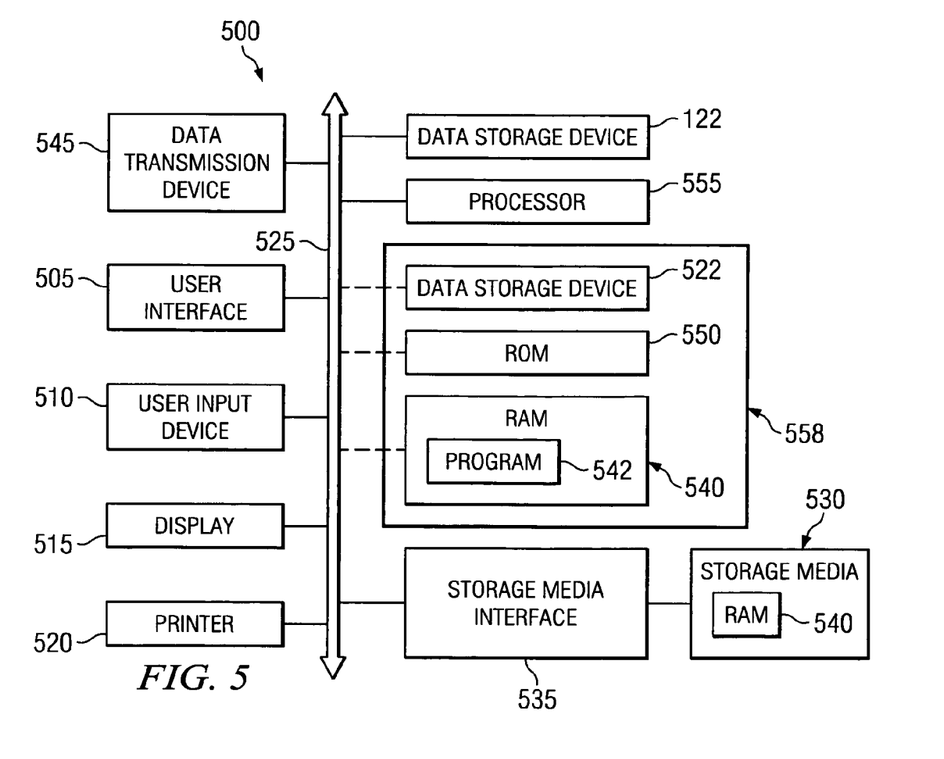
FIG. 5 is a block diagram of a computer system suitably configured for employment of the present invention.

FIG. 5 is a block diagram of a computer system 500, suitable for employment of the present invention. System 500 may be implemented on a general-purpose microcomputer, such as one of the members of the IBM Personal Computer family, or other conventional workstation or graphics computer devices. In its preferred embodiment, system 500 includes a user interface 505, a user input device 510, a display 515, a printer 520, a processor 555, a read only memory (ROM) 550, a data storage device 122, such as a hard drive, a random access memory (RAM) 540, and a storage media interface 535, all of which are coupled to a bus 525 or other communication means for communicating information. Although system 500 is represented herein as a standalone system, it is not limited to such, but instead can be part of a networked system, including a wireless system. The computer system 500 may be connected locally or remotely to fixed or removable data storage devices 122 and data transmission devices 545. For example, the server computer system 104 and the client computer system 102 also could be connected to other computer systems 500 via the data transmission devices 545. Elements 102 and 104 are described with reference to FIG. 1.

The RAM 540, the data storage device 122 and the ROM 550, are memory components 558 that store data and instructions for controlling the operation of the processor 555, which may be configured as a single processor or as a plurality of processors. The processor 555 executes a program 542, such as the application program 120 to perform the methods of the present invention, as described herein. Element 120 is described with reference to FIG. 1.

While the program 542 is indicated as loaded into the RAM 540, it may be configured on a storage media 530 for subsequent loading into the data storage device 122, the ROM 550, or the RAM 540 via an appropriate storage media interface 535. Storage media 530 can be any conventional storage media such as a magnetic tape, an optical storage media, a compact disk, or a floppy disk. Alternatively, storage media 530 can be a random access memory 540, or other type of electronic storage, located on a remote storage system.

Generally, the computer programs and operating systems are all tangibly embodied in a computer usable device or medium, such as the memory 558, the data storage device 122, or the data transmission devices 545, thereby making an article of manufacture, such as a computer program product, according to the invention. As such, the terms "computer program product" as used herein are intended to encompass a computer program accessible from any computer usable device or medium.

Moreover, the computer programs 542 and operating systems are comprised of instructions which, when read and executed by the server computer system 104 and the client computer system 102, cause the server computer system 104 and the client computer system 102 to perform the steps necessary to implement and use the present invention. Under control of the operating system, the computer programs 542 may be loaded from the memory 558, the data storage device 122, or the data transmission-devices 545 into the memories 558 of the server computer system 104 and the client computer system 102 for use during actual operations.

User interface 505 is an input device, such as a keyboard or speech recognition subsystem, for enabling a user to communicate information and command selections to the processor 555. The user can observe information generated by the system 500 via the display 515 or the printer 520. The user input device 510 is a device such as a mouse, track-ball, or joy stick that allows the user to manipulate a cursor on the display 515 for communicating additional information and command selections to the processor 555.

Those skilled in the art will recognize many modifications may be made to this configuration without departing from the scope of the present invention. When operating in accordance with one embodiment of the present invention, the system efficiently extends database transaction semantics that support a single-phase or a two-phase commit protocol to include user-defined operations 210 while supporting the XA Transaction Processing Protocol 214. The processor 555 and the program 542 collectively operate as a module, such as the application program 120, for extending database transaction semantics. It will be appreciated that the present invention offers many advantages over prior art techniques. Elements 210 and 214 are described with reference to FIG. 2.

The present invention is typically implemented using one or more computer programs, each of which executes under the control of an operating system and causes the server computer system 104 and the client computer system 102 to perform the desired operations as described herein. Thus, using the present specification, the invention may be implemented as a machine, process, method, system, or article of manufacture by using standard programming and engineering techniques to produce software, firmware, hardware or any combination thereof.

It will be understood that various alternatives and modifications may be devised by those skilled in the art. However, these should not be viewed as limitations upon the practice of these teachings, as those skilled in the art, when guided by the foregoing teachings, may derive other suitable characteristics of a similar or different nature. The present invention is intended to embrace all such alternatives, modifications and variances that fall within the scope of the appended claims.

TRADEMARKS

IBM, DB2, and OS/390 are trademarks of International Business Machines Corporation in the United States, other countries, or both. X/Open is a trademark or a registered trademark of the Open Group. UNIX is a trademark or a registered trademark of UNIX System Laboratories, Inc.

We claim:

1. A computer-implemented method for extending a database transaction to include at least one user-defined operation that accesses a computer resource by means of a Transaction Protocol describing a two-phase commit application programming interface (API) that operates between a transaction manager and a resource manager coupled to said computer resource for transaction processing distributed over computer systems, said method comprising:
   registering said user-defined operation and Transaction Protocol Interfaces used by said user-defined operation with a database, and wherein said computer resource accessed by said user-defined operation is external to said database;
   executing said database transaction, wherein said database transaction includes both said user-defined operation and one or more database operations, wherein said database transaction is initiated with a begin transaction operation and ends with a commit or rollback operation;

enabling said database to operate as said Transaction Manager by means of said Transaction Protocol, wherein said Transaction Manager manages distributed transactions by coordinating decisions about commit or rollback of pending transactions and coordinating failure recovery;

accessing said resource manager by said database operating as said Transaction Manager;

invoking said user-defined operation as part of said database transaction, wherein said user-defined operation is invoked by user-defined query code external to said database;

recording with said database that said user-defined operation has been invoked to enable triggering said database to invoke said Transaction Protocol Interfaces during commit and rollback;

executing said invoked and recorded user-defined operation while executing said database transaction;

accessing said computer resource in response to executing said invoked and recorded user-defined operation by said resource manager, thereby extending said database transaction;

in response to performing a commit of said database transaction, coordinating a commit of said computer resource accessed by said user-defined operation by said database invoking said Transaction Protocol Interfaces; and in response to performing a rollback of said database transaction, including said user-defined operation in said rollback by said database invoking said Transaction Protocol Interfaces to roll back said computer resource, wherein results of said database transaction that includes both said user-defined operation and said one or more database operations are atomic and are either completed with the commit or rolled back, wherein said user-defined operation accesses said computer resource that is external to said database.

2. The method of claim 1, wherein said database transaction is a single-phase transaction.

3. The method of claim 1, wherein said database transaction is a two-phase commit transaction.

4. The method of claim 1, wherein executing said database transaction comprises an application program initiating said database transaction.

5. The method of claim 1, wherein executing said database transaction comprises a transaction manager external to said database initiating said database transaction.

6. The method of claim 1, wherein said recording is completed with a Transaction Protocol Interface.

7. The method of claim 1, wherein said invoking said user-defined operation is completed with a data access module.

8. The method of claim 1, wherein said resource manager manages a distributed computer resource.

9. The method of claim 1, wherein said resource manager manages a local computer resource.

* * * * *